US012438270B2

(12) United States Patent
Eom

(10) Patent No.: US 12,438,270 B2
(45) Date of Patent: Oct. 7, 2025

(54) BROADBAND FEED NETWORK DEVICE FOR REALIZING LOW AXIAL RATIO CHARACTERISTICS AND A PLANAR ARRAY ANTENNA USING THE SAME

(71) Applicant: ELECTRONICS AND TELECOMMUNICATIONS RESEARCH INSTITUTE, Daejeon (KR)

(72) Inventor: Soon Young Eom, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 424 days.

(21) Appl. No.: 18/149,999

(22) Filed: Jan. 4, 2023

(65) Prior Publication Data

US 2024/0097328 A1 Mar. 21, 2024

(30) Foreign Application Priority Data

Sep. 15, 2022 (KR) ........................ 10-2022-0116379

(51) Int. Cl.

| | |
|---|---|
| ***H01Q 21/20*** | (2006.01) |
| ***H01Q 1/38*** | (2006.01) |
| ***H01Q 3/30*** | (2006.01) |
| ***H01Q 13/08*** | (2006.01) |
| ***H01Q 15/24*** | (2006.01) |
| ***H01Q 21/00*** | (2006.01) |
| ***H01Q 21/06*** | (2006.01) |

(52) U.S. Cl.
CPC ............... *H01Q 3/30* (2013.01); *H01Q 15/24* (2013.01); *H01Q 21/0006* (2013.01); *H01Q 21/061* (2013.01)

(58) Field of Classification Search
None
See application file for complete search history.

(56) References Cited

U.S. PATENT DOCUMENTS 6,121,931 A * 9/2000 Levi ......................... H01Q 5/42 343/846
6,147,648 A * 11/2000 Granholm ............ H01Q 21/065 343/700 MS
8,081,135 B2 12/2011 Pintos et al.
9,391,375 B1 7/2016 Bales et al.
2003/0201941 A1* 10/2003 Aikawa ................ H01Q 21/064 343/770
2013/0187830 A1* 7/2013 Warnick ............... H01Q 21/065 343/893

(Continued)

FOREIGN PATENT DOCUMENTS

CN 103500885 A 1/2014
CN 106935982 A * 7/2017 ............... H01Q 1/36

(Continued)

*Primary Examiner* — Mohammed Rachedine
(74) *Attorney, Agent, or Firm* — Rabin & Berdo, P.C.

(57) ABSTRACT

A feed network device, which is electrically connected to unit radiating elements for circular polarization, may comprise a phase offset compensation circuit configured to correct a phase dispersion error according to a change in frequency so that four quarter arrays obtained by vertically and horizontally dividing a planar array of the unit radiating elements symmetrically are electrically and rotatably sequentially disposed clockwise or counterclockwise.

20 Claims, 16 Drawing Sheets

(56) References Cited

U.S. PATENT DOCUMENTS

| | | | | |
|---|---|---|---|---|
| 2020/0235490 | A1* | 7/2020 | Carceller | H01Q 9/0478 |
| 2022/0239002 | A1 | 7/2022 | Eom | |
| 2022/0302603 | A1* | 9/2022 | Chieh | H01Q 21/0075 |

FOREIGN PATENT DOCUMENTS

| | | | | | |
|---|---|---|---|---|---|
| CN | 109994822 | B | * | 8/2020 | H01Q 21/061 |
| CN | 114725692 | A | * | 7/2022 | H01Q 1/36 |
| CN | 218039796 | U | * | 12/2022 | |
| EP | 0434268 | B1 | | 2/1995 | |
| KR | 10-0449846 | B1 | | 9/2004 | |
| KR | 10-2005-0069286 | A | | 7/2005 | |
| KR | 20060005536 | A | | 1/2006 | |
| KR | 20100066265 | A | | 6/2010 | |
| KR | 10-2080305 | B1 | | 2/2020 | |
| KR | 20220014552 | A | * | 2/2022 | H01Q 1/246 |
| KR | 20220107501 | A | | 8/2022 | |

* cited by examiner

BROADBAND FEED NETWORK DEVICE FOR REALIZING LOW AXIAL RATIO CHARACTERISTICS AND A PLANAR ARRAY ANTENNA USING THE SAME

CROSS-REFERENCE TO RELATED APPLICATIONS

This application claims priority to Korean Patent Application No. 10-2022-0116379, filed on Sep. 15, 2022, with the Korean Intellectual Property Office (KIPO), the entire contents of which are hereby incorporated by reference.

BACKGROUND

1. Technical Field

Exemplary embodiments of the present disclosure relate to a wideband planar array antenna having circular polarization, and more specifically, to a broadband feed network device for realizing low axial ratio characteristics and a planar array antenna using the same.

2. Related Art

In the conventional planar array antenna technology with circular polarization, a plurality of different feed networks are generally used for a planar array antenna operating in a narrowband or multiple bands.

Further, when a planar array antenna operating in a wideband is designed, it is possible to design unit radiating elements in a wideband, but in designing of a feed network, it is difficult to implement excellent axial ratio characteristics in a wideband because a large phase dispersion error according to a change in frequency occurs.

Accordingly, in the conventional planar array antenna technology, a method capable of implementing low axial ratio characteristics in a wideband is required.

SUMMARY

Accordingly, exemplary embodiments of the present disclosure are provided to substantially obviate one or more problems due to limitations and disadvantages of the related art.

Exemplary embodiments of the present disclosure are derived to meet the above-described needs of the conventional planar array antenna technology, which provide a planar array antenna having circular polarization with low axial ratio characteristics in a wideband by introducing a circuit network that corrects a frequency-phase dispersion error generated when a feed network for implementing circular polarization is designed in a wideband.

Exemplary embodiments of the present disclosure also provide a feed network device capable of correcting a frequency-phase dispersion error in order to implement low axial ratio characteristics in a wideband planar array antenna.

According to a first exemplary embodiment of the present disclosure, a feed network device, which is electrically connected to unit radiating elements for circular polarization, may comprise a phase offset compensation circuit configured to correct a phase dispersion error according to a change in frequency so that four quarter arrays obtained by vertically and horizontally dividing a planar array of the unit radiating elements symmetrically are electrically and rotatably sequentially disposed clockwise or counterclockwise.

The phase offset compensation circuit may include a 180° phase offset compensation circuit, and two 90° phase delay compensation circuits coupled to both ends of the 180° phase offset compensation circuit.

The 180° phase offset compensation circuit may include a standard transmission line with a 360° electrical length, a main line with a 180° electrical length, and open-short stub lines coupled to both ends of the main line and having a 45° electrical length, wherein a characteristic impedance of the main line and characteristic impedances of the open-short stub lines are adjusted to adjust a slope of the phase dispersion error according to a change in frequency of a transmission line.

Each of the two 90° phase delay compensation circuits may include a standard transmission line with a 270° electrical length, a main line with a 180° electrical length, and open-short stub lines coupled to both ends of the main line and having a 45° electrical length, wherein a characteristic impedance of the main line and characteristic impedances of the open-short stub lines are adjusted to adjust a slope of the phase dispersion error according to a change in frequency of the transmission line.

Each of the two 90° phase delay compensation circuits may be configured to provide two output power feeds having the same transmission amplitude and a 90° phase difference characteristic.

Electrical characteristics of the four output power feeds provided by the two 90° phase delay compensation circuits may be configured so that the quarter arrays are rotatably sequentially disposed clockwise or counterclockwise by 90°.

The feed network device may further comprise four power distribution circuits coupled to the two 90° phase delay compensation circuits.

Among the four power distribution circuits, a first power distribution circuit and a second power distribution circuit may be connected to one side and the other side of the 90° phase delay compensation circuit positioned on one side of the 180° phase offset compensation circuit, respectively, and may disposed to supply power to each of two quarter arrays of the four quarter arrays, and among the four power distribution circuits, a third power distribution circuit and a fourth power distribution circuit may be connected to one side and the other side of the 90° phase delay compensation circuit positioned on the other side of the 180° phase offset compensation circuit, respectively, and may be disposed to supply power to each of remaining two quarter arrays of the four quarter arrays.

The four quarter arrays may include a first ring array disposed at an inner center of a planar array having a circular structure, a second ring array disposed around the first ring array, and a third ring array which is spaced a predetermined interval from the second ring array and disposed on an outer edge of the planar array, wherein the four power distribution circuits are controlled so that the first ring array and the second ring array have the same phase and the third ring array has a phase opposite thereto.

The feed network device may further comprise a control device configured to control operations of the four power distribution circuits.

According to a second exemplary embodiment of the present disclosure, a planar array antenna may comprise: unit radiating elements configured to constitute a planar array and generate circular polarization; and a feed network device which is electrically connected to the unit radiating elements, wherein the feed network device includes a phase offset compensation circuit that corrects a phase dispersion error according to a change in frequency so that four quarter arrays obtained by symmetrically vertically and horizontally dividing the planar array symmetrically are electrically and rotatably sequentially disposed clockwise or counterclockwise.

The phase offset compensation circuit may include a 180° phase offset compensation circuit, and two 90° phase delay compensation circuits coupled to both ends of the 180° phase offset compensation circuit.

The 180° phase offset compensation circuit may include a standard transmission line with a 360° electrical length, a main line with a 180° electrical length, and open-short stub lines coupled to both ends of the main line and having a 45° electrical length, wherein a characteristic impedance of the main line and characteristic impedances of the open-short stub lines are adjusted to adjust a slope of the phase dispersion error according to a change in frequency of a transmission line.

Each of the two 90° phase delay compensation circuits may include a standard transmission line with a 270° electrical length, a main line with a 180° electrical length; and open-short stub lines coupled to both ends of the main line and having a 45° electrical length, wherein a characteristic impedance of the main line and characteristic impedances of the open-short stub line are adjusted to adjust a slope of the phase dispersion error according to a change in frequency of the transmission line.

Each of the two 90° phase delay compensation circuits may provide two output power feeds with the same transmission amplitude and characteristic of a 90° phase difference.

Electrical characteristics of the four output power feeds provided by the two 90° phase delay compensation circuits may be configured so that the quarter arrays are rotatably sequentially disposed clockwise or counterclockwise by 90°.

The feed network device may further include four power distribution circuits coupled to the two 90° phase delay compensation circuits.

Among the four power distribution circuits, a first power distribution circuit and a second power distribution circuit may be connected to one side and the other side of the 90° phase delay compensation circuit positioned on one side of the 180° phase offset compensation circuit, respectively, and may be disposed to supply power to each of two quarter arrays of the four quarter arrays, and among the four power distribution circuits, a third power distribution circuit and a fourth power distribution circuit may be connected to one side and the other side of the 90° phase delay compensation circuit positioned on the other side of the 180° phase offset compensation circuit, respectively, and may be disposed to supply power to each of remaining two quarter arrays of the four quarter arrays.

The four quarter arrays may include a first ring array disposed at an inner center of a planar array having a circular structure, a second ring array disposed around the first ring array, and a third ring array which is spaced a predetermined interval from the second ring array and disposed on an outer edge of the planar array, wherein the four power distribution circuits are controlled so that the first ring array and the second ring array have the same phase and the third ring array has a phase opposite thereto.

The planar array antenna may further comprise a control device configured to control operations of the four power distribution circuits.

According to the present disclosure, in order to correct a frequency-phase dispersion error in a feed network of a planar array antenna, by placing open-short stub lines having a 45° electrical length on both ends of a main line having a 180° electrical length and adjusting characteristic impedances of the main line and the stub lines, it is possible to adjust a slope of a phase characteristic of a transmission line, thereby designing a feed network that reduces a frequency-phase dispersion error in a wideband.

Further, according to the present disclosure, it is possible to provide a feed network design technology that enables a planar array antenna having circular polarization to have low AR characteristics in a wideband.

According to the present disclosure, it is possible to design a feed network capable of correcting a phase dispersion error according to a change in frequency in a wideband, and thus it is expected that a planar array antenna having wideband circular polarization with excellent AR characteristics can be developed.

DETAILED DESCRIPTION OF THE EMBODIMENTS

Figure 1A:
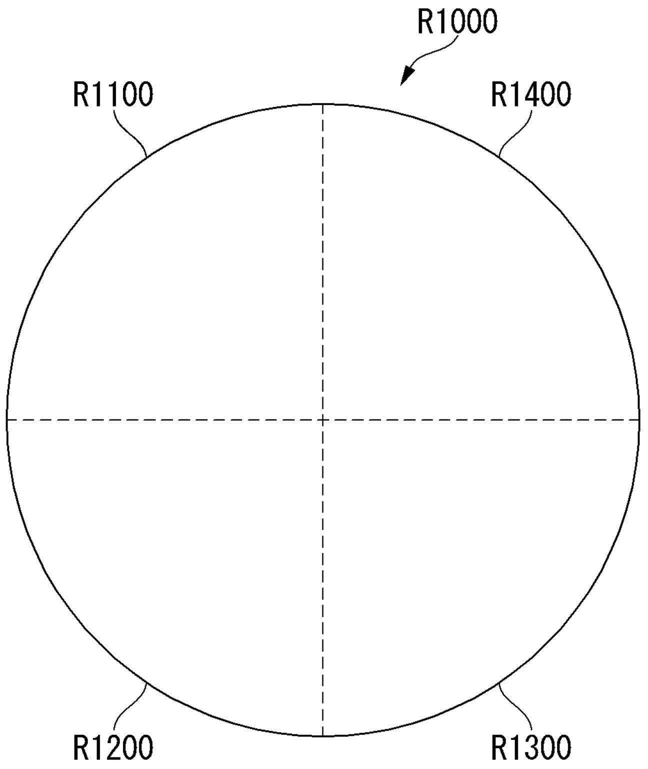
FIG. 1A is a diagram illustrating an upper shape of a planar array antenna having a circular structure according to an embodiment of the present disclosure.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

Figure 1B:
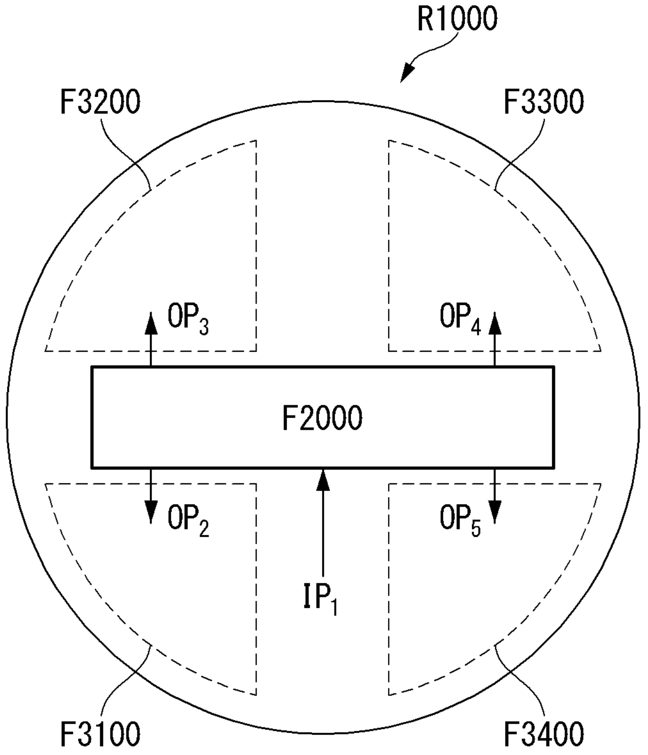
FIG. 1B is a diagram illustrating a lower shape of the planar array antenna of FIG. 1A.

FIG. 1A is a diagram illustrating an upper shape of a planar array antenna having a circular structure according to an embodiment of the present disclosure. FIG. 1B is a diagram illustrating a lower shape of the planar array antenna of FIG. 1A.

Referring to FIG. 1A, when viewing an antenna having a circular structure from the top front, a planar array antenna R1000 may include radiation areas R1100, R1200, R1300, and R1400 obtained by dividing an entire upper planar area on which radiating elements are disposed by four. These four radiation areas may be referred to as a planar array, a quarter array, or a quarter radiation array.

Further, when viewing an antenna having a circular structure from the bottom rear, the planar array antenna R1000 may include feed networks F2000, F3100, F3200, F3300, and F3400 which are disposed in a lower area thereof, as illustrated in FIG. 1B. Some feed networks F3100, F3200, F3300, and F3400 may be disposed on to physically correspond to the radiation areas R1100, R1200, R1300, and R1400 which are arranged in quarters in an upper area of the planar array antenna R1000. Some feed networks F3100, F3200, F3300, and F3400 may be referred to as quarter feed networks.

The feed network F2000 disposed at the center between the quarter feed networks may be a 4-way feed network that outputs uniform power to the quarter feed networks. The 4-way feed network may be referred to as a main feed network. In view of a transmission antenna, such a main feed network may have one input port $IP_1$ for the planar array antenna R1000 and four output ports $OP_2$, $OP_3$, $OP_4$, and $OP_5$ for the four quarter feed networks.

In order to design a planar array antenna having circular polarization with low axial ratio (AR) characteristics, it is necessary to sequentially delay the phase feeding for each quarter array (or ¼ array) by 90° clockwise or counterclockwise.

In order for a planar array antenna having circular polarization to have low AR characteristics in a wideband, amplitude and phase distribution characteristics according to a change in frequency required by the main feed network F2000 are very important. That is, in order to obtain excellent AR characteristics in a wideband, amplitude characteristics of four output signals should be the same over a desired wideband, and phase characteristics should be controlled to sequentially differ by 90°.

Figure 2:
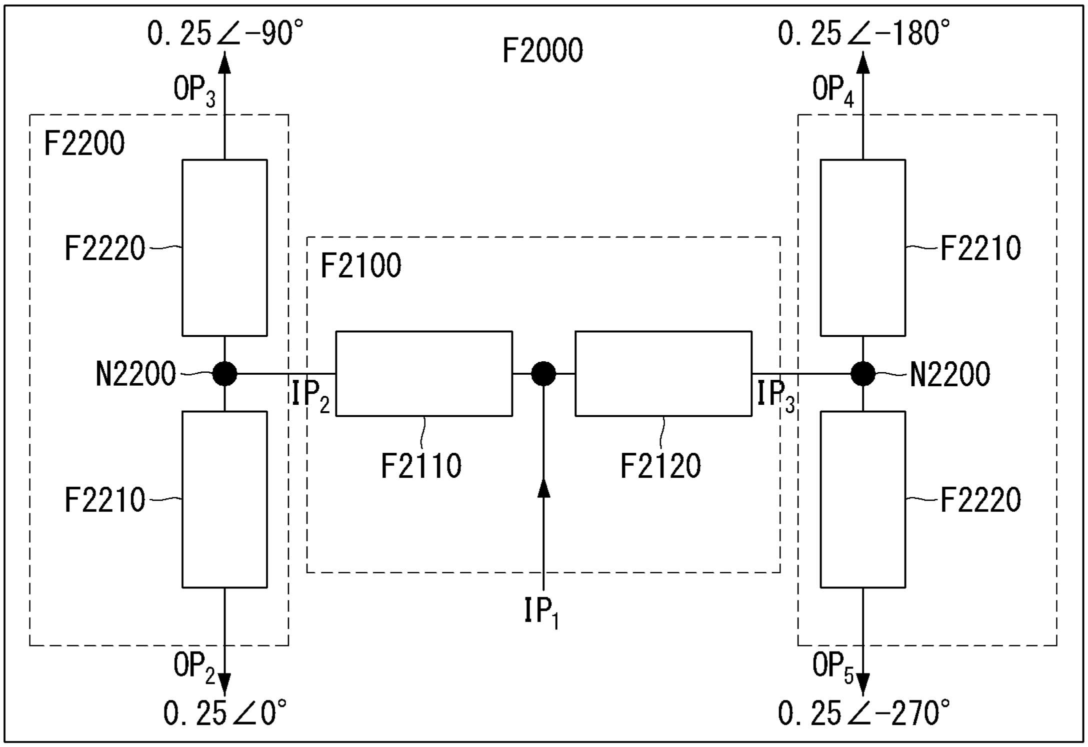
FIG. 2 is a diagram illustrating a 4-way wideband feed network, in which a frequency-phase dispersion error is corrected, that can be applied to the planar array antenna of FIG. 1B.

FIG. 2 is a diagram illustrating a 4-way wideband feed network, in which a frequency-phase dispersion error is corrected, that can be applied to the planar array antenna of FIG. 1B.

Referring to FIG. 2, a feed network F2000 is a 4-way wideband feed network for a planar array antenna and may include a total of three T-branch circuits F2100 and F2200. That is, the feed network F2000 may include one first T-branch circuit F2100 and two second T-branch circuits F2200. The first T-branch circuit F2100 and the second T-branch circuits F2200 may be T-branch circuits in different types.

The first T-branch circuit F2100 may internally include a first T-junction circuit N2100, a 180° phase offset compensation (POC) circuit network F2110 having a 180° electrical length, and a standard transmission line (STL) F2120 having a 360° electrical length, and may provide a uniform 180° phase delay difference in the wideband.

The second T-branch circuit F2200 may internally include a second T-junction circuit N2200, a 90° POC circuit network F2210 having a 180° electrical length, and a STL F2220 having a 270° electrical length, and may provide a uniform 90° phase delay difference in the wideband.

The 4-way wideband feed network described above with reference to FIG. 2 is illustrated as an embodiment and has a structure of a wideband feed network for implementing right polarization. A structure of a wideband feed network for implementing left polarization may be easily implemented by exchanging a position of the 90° POC circuit network F2210 having the 180° electrical length and a position of the STL F2220 having the 270° electrical length of FIG. 2 with each other. In this case, a position of the 180° POC circuit network F2110 having the 180° electrical length is the same as a position of the STL F2120 having the 360° electrical length.

The first T-branch circuit F2100 and second T-branch circuits F2200 will be described in more detail with reference to FIGS. 3 and 4.

Figure 3:
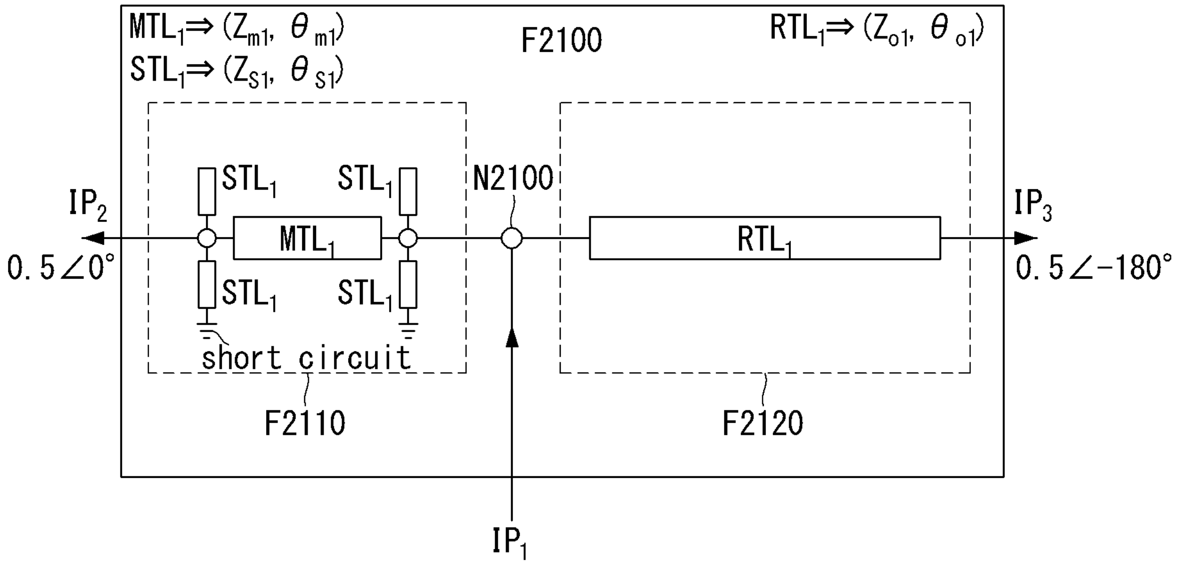
FIG. 3 is an exemplary diagram of a first T-branch circuit that can be applied to the wideband feed network of FIG. 2.

FIG. 3 is an exemplary diagram of a first T-branch circuit that can be applied to the wideband feed network of FIG. 2.

Referring to FIG. 3, a first T-junction circuit N2100 performs an impedance conversion function for 3-port input/output matching, and is connected to the STL F2120 having the 360° electrical length in one side or right direction and connected to the first POC circuit network F2110 having the 180° electrical length in the other side or left direction.

The first POC circuit network F2110 is a 180° POC circuit network and may include one main line $MTL_1$ and open and short stub lines $STL_1$ attached to both ends of the main line $MTL_1$, as illustrated in FIG. 3. The main line $MTL_1$ of the first POC circuit network F2110 may be referred to as a first main line, and the open and short stub lines $STL_1$ may be referred to as first stub lines.

Electrical characteristics of the first main line $MTL_1$ include a characteristic impedance $Z_{m1}$ and a first main phase $\theta_{m1}$ (here, $\theta_{m1}$=180°, and electrical characteristics of the first stub line include a characteristic impedance $Z_{s1}$ and a first branch phase $\theta_{s1}$ (here, $\theta_{s1}$=45°. The characteristic impedance $Z_{m1}$ of the first main line $MTL_1$ and the characteristic impedance $Z_{s1}$ of the first stub line $STL_1$ are important design parameters for adjusting a frequency-phase dispersion slope. The characteristic impedance $Z_{m1}$ of the first main line $MTL_1$ may be referred to as a first main characteristic impedance, a phase of the first main line $MTL_1$ may be referred to as a first main phase, the characteristic impedance $Z_{s1}$ of the first stub line $STL_1$ may be referred to as a first branch characteristic impedance, and a phase of the first stub line $STL_1$ may be referred to as a first branch phase.

As an example, in an operation of a 40% bandwidth, optimal design parameter values of the first main characteristic impedance $Z_{m1}$ and the first branch characteristic impedance $Z_{s1}$ for correcting a 180° frequency-phase dispersion error are 1.62 $Z_o$[Ω] and 1.26 $Z_o$[Ω], respectively. Here, $Z_o$ denotes a characteristic impedance of three input and output ports and may have a value of 50Ω.

Further, an STL $RTL_1$ having a 360° electrical length is a simple reference transmission line (RTL) and may be referred to as a first STL, and electrical characteristics of the STL $RTL_1$ may include a first reference characteristic impedance $Z_{o1}$ (here, $Z_{o1}$=$Z_o$) and a first reference phase $\theta_{o1}$ (here, $\theta_{o1}$=360°.

Under these design conditions, when input impedances branching off to two paths is set to be identical, amplitudes of signals branching off to two paths in the operation of the 40% bandwidth may be identical to each other, and may be controlled to generate a uniform 180° phase difference.

Figure 4:
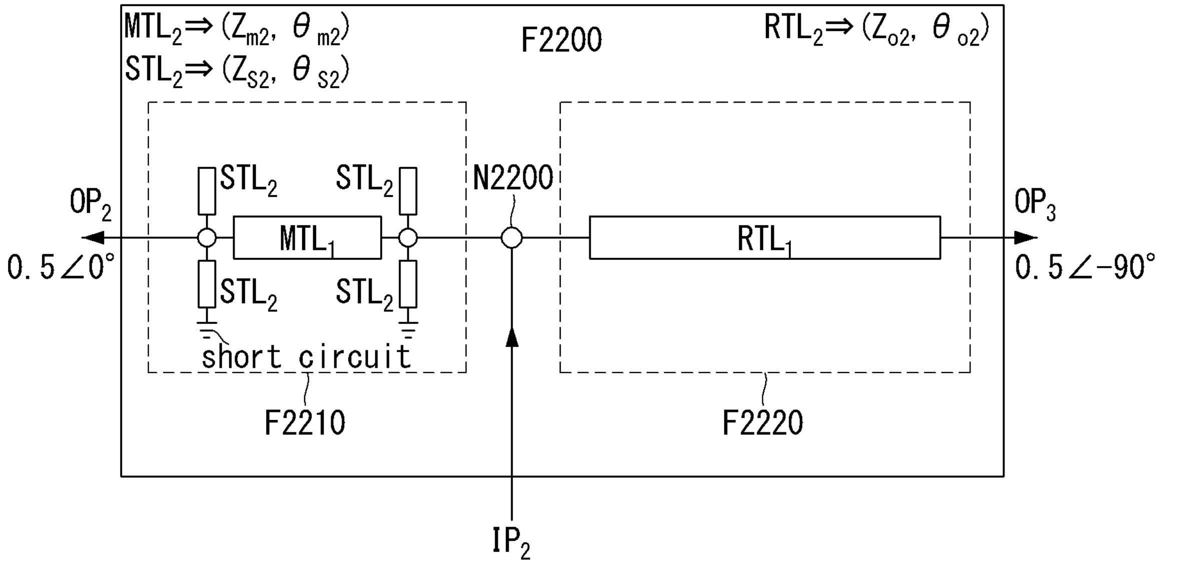
FIG. 4 is an exemplary diagram of a second T-branch circuit that can be applied to the wideband feed network of FIG. 2.

FIG. 4 is an exemplary diagram of a second T-branch circuit that can be applied to the wideband feed network of FIG. 2.

Referring to FIG. 4, a second T-junction circuit N2200 performs an impedance conversion function for 3-port input/output matching, and is connected to the STL F2220 having the 270° electrical length in one side or right direction and connected to the second POC circuit network F2210 having the 180° electrical length in the other side or left direction.

The second POC circuit network F2210 is a 90° POC circuit network and may include one main line $MTL_2$ and open and short stub lines $STL_2$ attached to both ends of the main line $MTL_2$, as illustrated in FIG. 4. The main line $MTL_2$ of the second POC circuit network F2210 may be referred to as a second main line, and the open and short stub lines $STL_2$ may be referred to as second stub lines.

Electrical characteristics of the second main line $MTL_2$ include a characteristic impedance $Z_{m2}$ and a second main phase $\theta_{m2}$ (here, $\theta_{m2}$)=180°, and electrical characteristics of the second stub line include a characteristic impedance $Z_{s2}$ and a second branch phase $\theta_{s2}$ (here, $\theta_{s2}$=45'). The characteristic impedance $Z_{m2}$ of the second main line $MTL_2$ and the characteristic impedance $Z_{s2}$ of the second stub line $STL_2$ are important design parameters for adjusting a frequency-phase dispersion slope. The characteristic impedance $Z_{m2}$ of the second main line $MTL_2$ may be referred to as a second main characteristic impedance, a phase of the second main line $MTL_2$ may be referred to as a second main phase, the characteristic impedance $Z_{s2}$ of the second stub line $STL_2$ may be referred to as a second branch characteristic impedance, and a phase of the second stub line $STL_2$ may be referred to as a second branch phase.

As an example, in an operation of a 40% bandwidth, optimal design parameter values of the second main characteristic impedance $Z_{m2}$ and the second branch characteristic impedance $Z_{s2}$ for correcting a 90° frequency-phase dispersion error are 1.36 $Z_o$[Ω] and 2.51 $Z_o$[Ω], respectively. Here, $Z_o$ denotes a characteristic impedance of three input and output ports.

Further, an STL $RTL_2$ having a 270° electrical length is a simple RTL and may be referred to as a second STL, and electrical characteristics of the STL $RTL_2$ may include a second reference characteristic impedance $Z_{o2}$ (here, $Z_{o2}$=$Z_o$) and a second reference phase $\theta_{o2}$ (here, $\theta_{o2}$=270°.

Under these design conditions, when input impedance branching off to two paths is set to be identical, amplitudes of the signals branching off to two paths in the operation of a 40% bandwidth are identical to each other, and may be controlled to generate a uniform 90° phase difference.

Figure 5A:
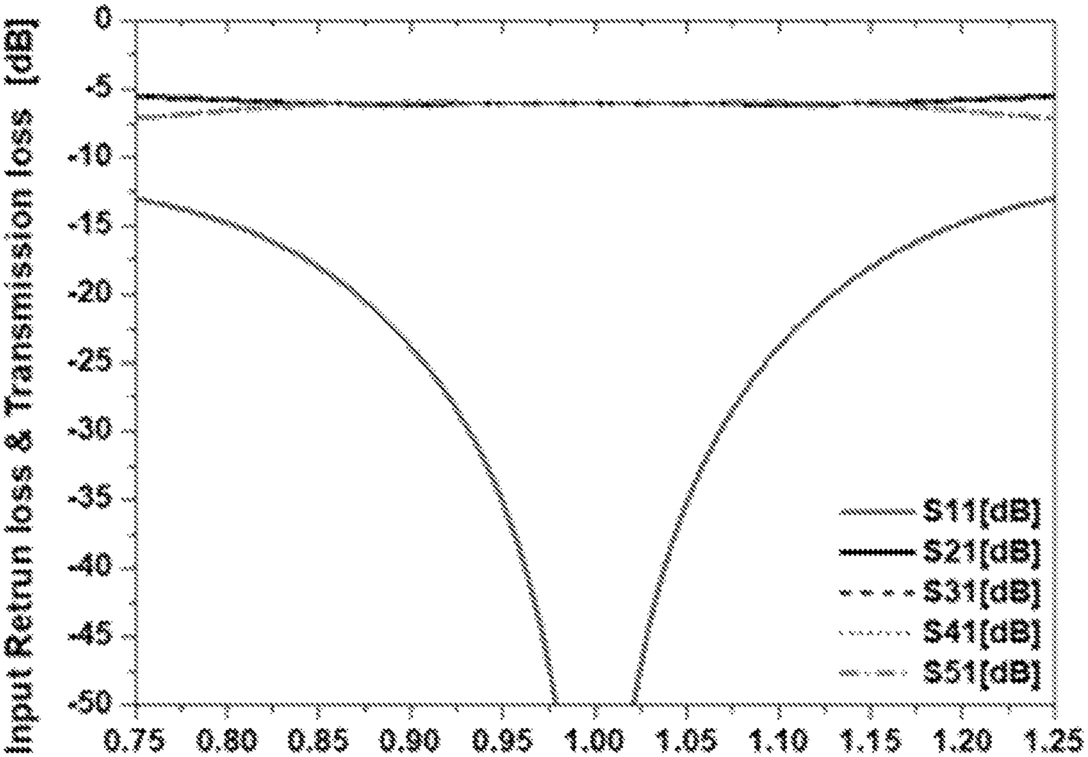
FIGS. 5A and 5B are diagrams showing simulation results of electrical characteristics of a 4-way feed network using a difference in electrical length between STLs of a comparative example.
Figure 5B:
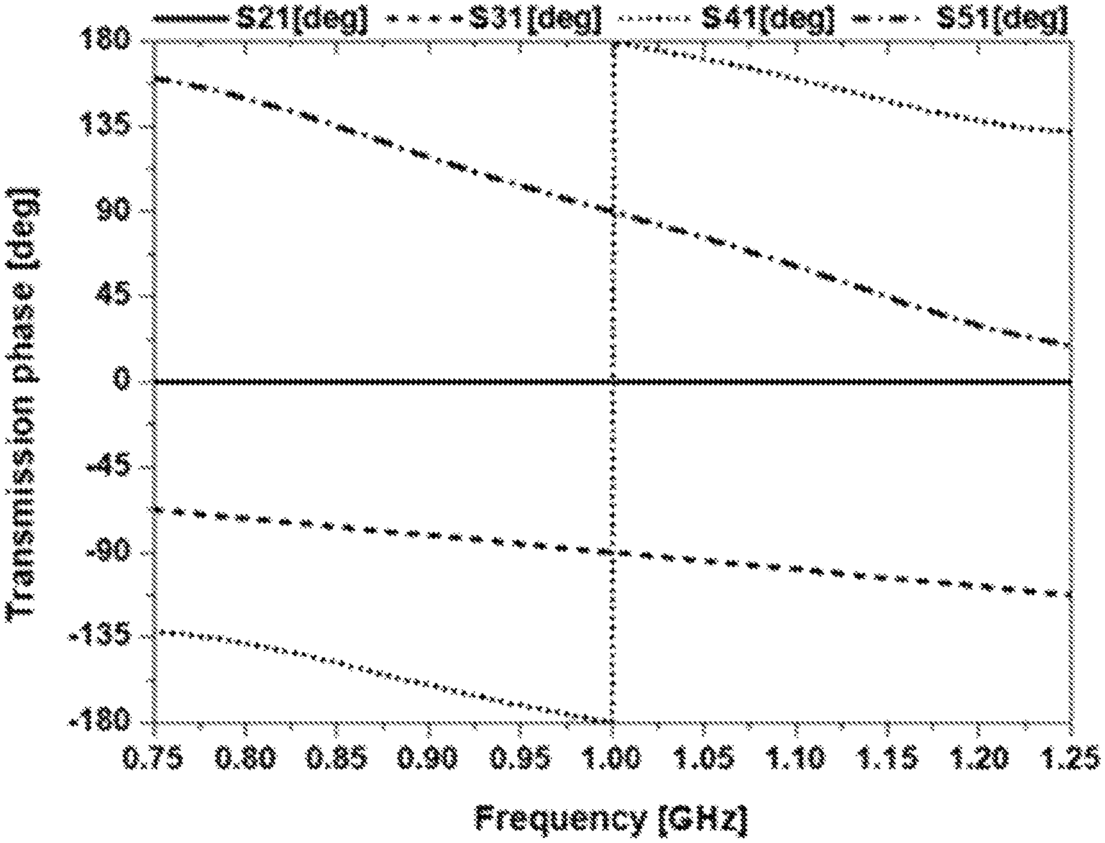

FIGS. 5A and 5B are diagrams showing simulation results of electrical characteristics of a 4-way feed network using a difference in electrical length between STLs of a comparative example.

Referring to FIGS. 5A and 5B, under the assuming that the feed network of the comparative example is operated in a 40% bandwidth (0.8 to 1.2 GHz), an input return loss characteristic of the feed network exhibits 14.8 dB or more, a relative amplitude error between four channels exhibits ±0.6 dB or less, and a maximum cumulative phase error between the four channels exhibits ±60° or less.

That is, FIG. 5A shows input return loss characteristics and transmission loss characteristics of channels $S_{21}$, $S_{31}$, $S_{41}$, and $S_{51}$ from an input port $IP_1$ of the feed network of the comparative example in view of a frequency, and FIG. 5B shows transmission phase characteristics of the feed network of the comparative example in view of a frequency.

As described above, in the feed network of the comparative example, the input return loss characteristics and the relative amplitude error between the four channels are good, but the maximum cumulative phase error between the four channels is very large, and accordingly, the frequency-phase dispersion error cannot be corrected in a wideband, and thus it is impossible to implement excellent AR characteristics in a wideband.

Table 1 summarizes and shows electrical characteristics of a 4-way uniform power distribution feed network using the difference in electrical length between the STLs of the comparative example described above.

TABLE 1

| Channels | S-parameters Transmission amplitude [dB] | S-parameters Transmission phase [deg] | Note |
|---|---|---|---|
| $S_{21}$ ($IP_1$ => $OP_2$) | −6.0 ± 0.2 dB | 0° | Reference channel |
| $S_{31}$ ($IP_1$ => $OP_3$) | −6.0 ± 0.2 dB | −90° ± 18° | |
| $S_{41}$ ($IP_1$ => $OP_4$) | −6.0 ± 0.6 dB | −180° ± 42° | |
| $S_{51}$ ($IP_1$ => $OP_5$) | −6.0 ± 0.6 dB | −270° ± 60° | Max. cumulative phase error |

As shown in Table 1, in the feed network of the comparative example, among characteristic parameters (S-parameters) of the channels $S_{21}$, $S_{31}$, $S_{41}$, and $S_{51}$, transmission amplitudes may have sizes of −6.0±0.2 dB and −6.0±0.6 dB, and transmission phases may have angles of 0°, −90°±18°, −180°±42°, and −270°±60° with respect to a preset reference phase.

Figure 6A:
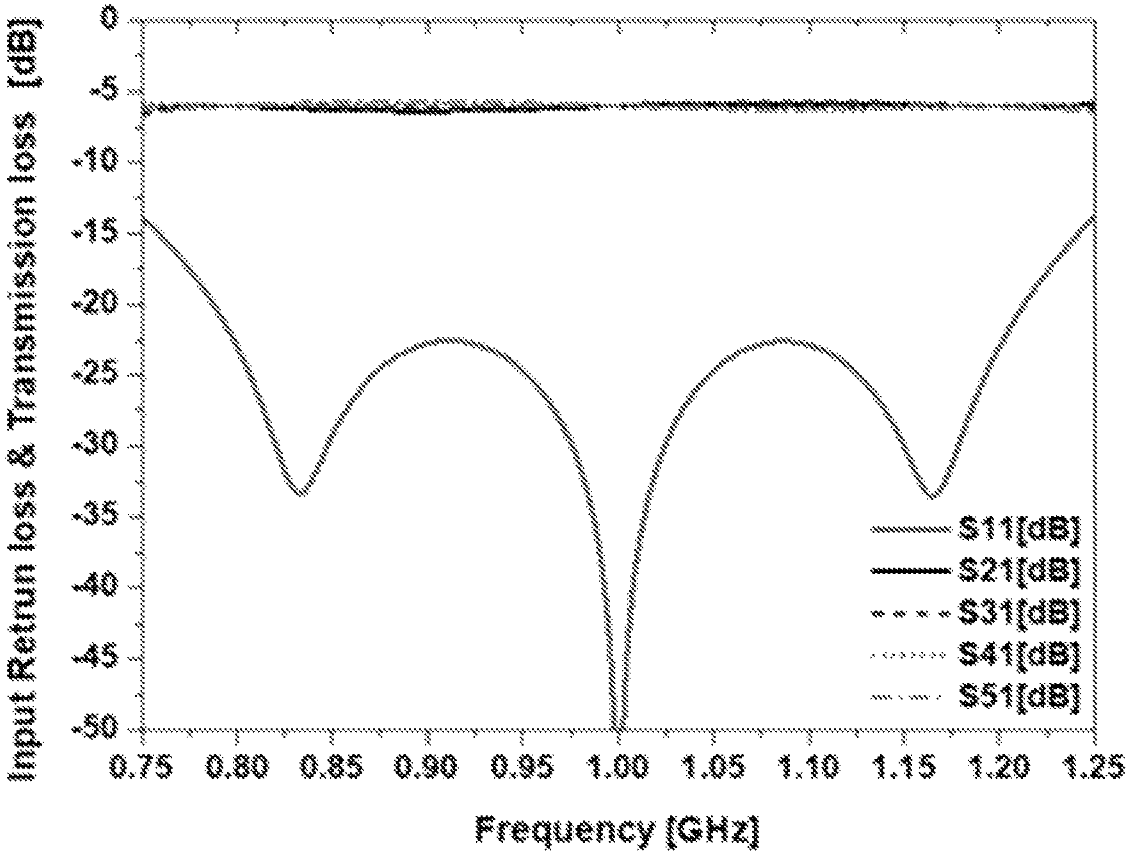
FIGS. 6A and 6B are diagrams showing simulation results of electrical characteristics of a 4-way feed network using the frequency-phase dispersion error correction circuit of FIG. 2.
Figure 6B:
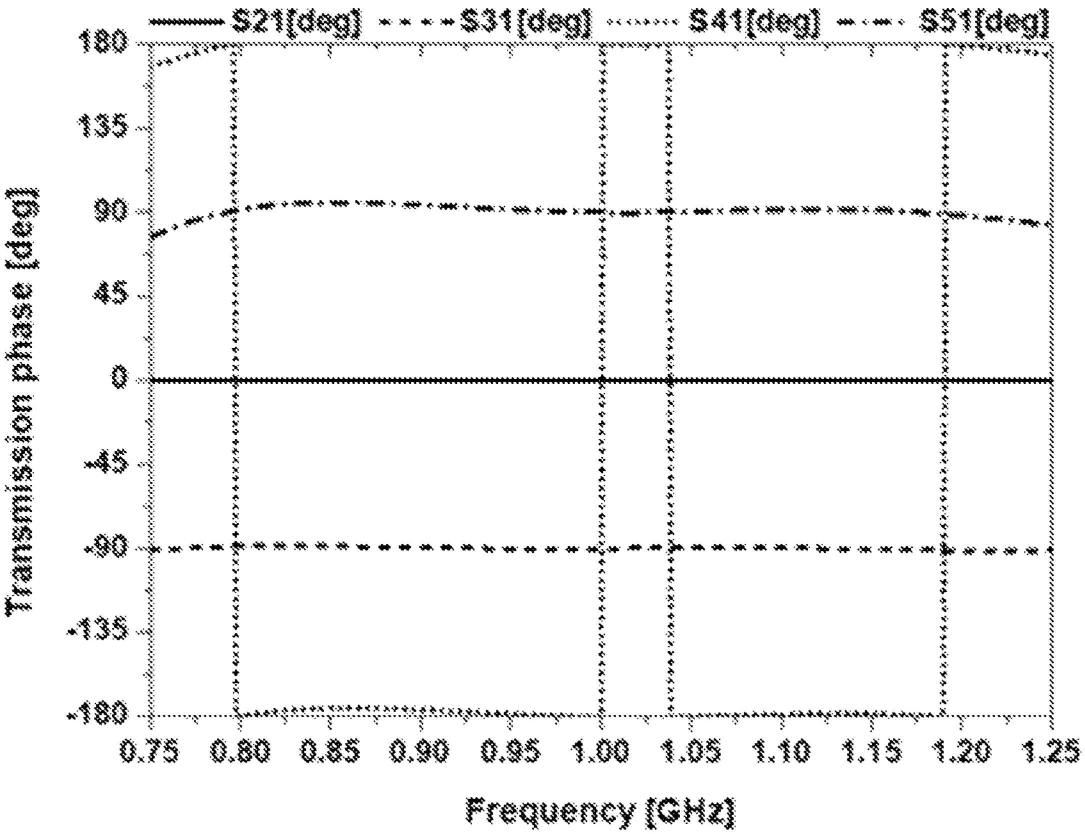

FIGS. 6A and 6B are diagrams showing simulation results of electrical characteristics of a 4-way feed network using the frequency-phase dispersion error correction circuit of FIG. 2.

Referring to FIGS. 6A and 6B, under the assuming that the feed network of the present embodiment is operated in a 40% bandwidth (0.8 to 1.2 GHz), an input return loss characteristic of the feed network exhibits 22.6 dB or more, a relative amplitude error between four channels exhibits ±0.3 dB or less, and the relative amplitude error between the four channels and a maximum cumulative phase error between the four channels are very excellent, and thus it is possible to implement excellent AR characteristics in a wideband.

Table 2 summarizes and shows electrical characteristics of a 4-way feed network using the frequency-phase dispersion error correction circuit.

TABLE 2

| Channels | S-parameters Transmission amplitude [dB] | S-parameters Transmission phase [deg] | Note |
|---|---|---|---|
| $S_{21}$ ($IP_1$ => $OP_2$) | −6.0 ± 0.3 dB | 0° | Reference channel |
| $S_{31}$ ($IP_1$ => $OP_3$) | −6.0 ± 0.3 dB | −90° ± 1.2° | |
| $S_{41}$ ($IP_1$ => $OP_4$) | −6.0 ± 0.3 dB | −180° ± 4.3° | |
| $S_{51}$ ($IP_1$ => $OP_5$) | −6.0 ± 0.3 dB | −270° ± 5.3° | Max. cumulative phase error |

As shown in Table 2, in the feed network of the present embodiment, among characteristic parameter (S-parameters) of the channels $S_{21}$, $S_{31}$, $S_{41}$, and $S_{51}$, transmission amplitudes may have a uniform size of −6.0±0.3 dB, and transmission phases may have a substantially uniform difference angle of 0°, −90°±1.2°, −180°±4.3°, and −270°±5.3° with respect to a preset reference phase.

Figure 7:
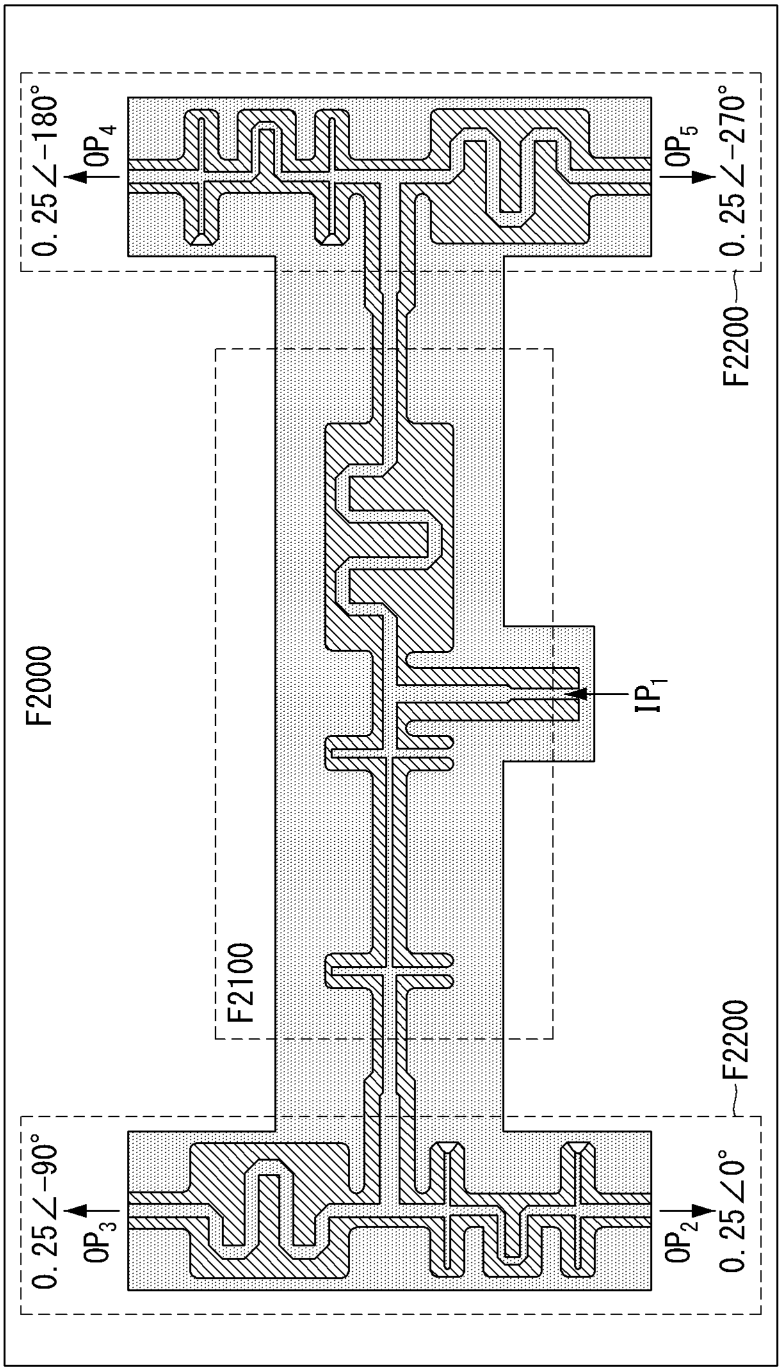
FIG. 7 illustrates a wideband feed network according to another embodiment of the present disclosure, and is a diagram illustrating a printed circuit board (PCB) layout of a 4-way feed network using a frequency-phase dispersion error correction circuit optimized in design in a global navigation satellite system (GNSS) band (1.1 to 1.6 GHz, fc=1.35 GHz).
Figure 8A:
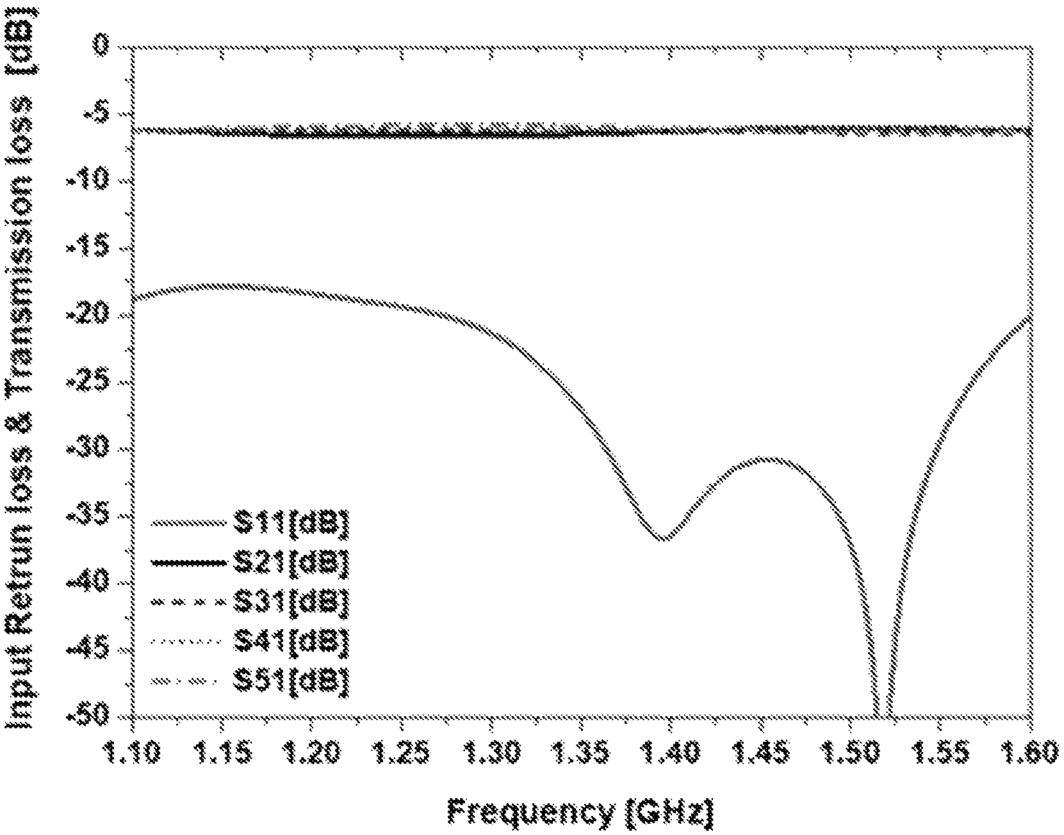
FIGS. 8A and 8B show electrical characteristics of the wideband feed network of FIG. 7, and are diagrams showing simulation results of electrical characteristics of a 4-way feed network optimized in design in a GNSS band (1.1 to 1.6 GHz, fc=1.35 GHz).
Figure 8B:
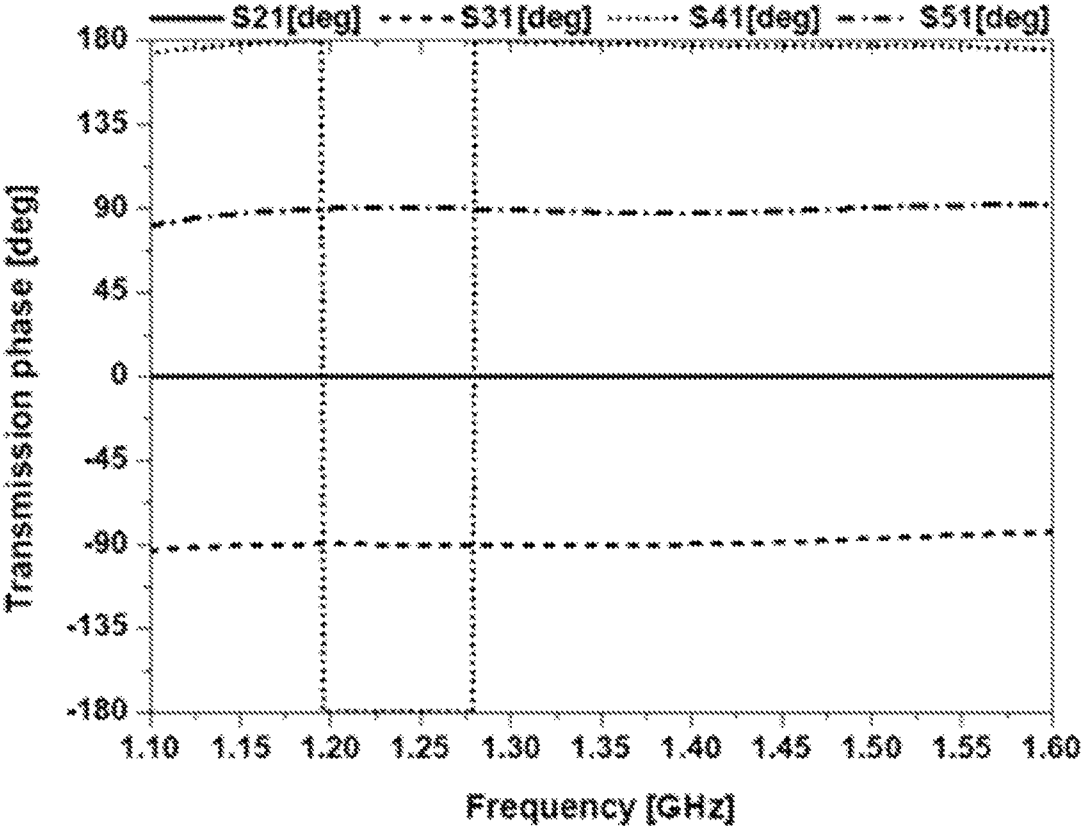

FIG. 7 illustrates a wideband feed network according to another embodiment of the present disclosure, and is a diagram illustrating a printed circuit board (PCB) layout of a 4-way feed network using a frequency-phase dispersion error correction circuit optimized in design in a global navigation satellite system (GNSS) band (1.1 to 1.6 GHz, fc=1.35 GHz). In addition, FIGS. 8A and 8B show electrical characteristics of the wideband feed network of FIG. 7, and are diagrams showing simulation results of electrical characteristics of a 4-way feed network optimized in design in a GNSS band (1.1 to 1.6 GHz, fc=1.35 GHz).

Referring to FIG. 7, the feed network F2000 is a 4-way wideband feed network for a planar array antenna and may include one first T-branch circuit F2100 and two second T-branch circuits F2200. The first T-branch circuit F2100 and the second T-branch circuits F2200 may be the same in that they have a waveguide structure, but may be T-branch circuits in different types having different shapes of main lines and stub lines.

The feed network F2000 may receive power through an input port $IP_1$ of the first T-branch circuit F2100, and, when viewed from the front of FIG. 7, may output first power having a characteristic of 0.25<0° through a first output port $OP_2$ of the second T-branch circuit F2200 illustrated at a lower left of the first T-branch circuit F2100, output second power having a characteristic of 0.25<−90° through a second output port $OP_3$ of the second T-branch circuit F2200 illustrated at an upper left of the first T-branch circuit F2100, output third power having a characteristic of 0.25<−180° through a third output port $OP_4$ of the second T-branch circuit F2200 illustrated at an upper right of the first T-branch circuit F2100, and output fourth power having a characteristic of 0.25<−270° through a fourth output port $OP_5$ of the second T-branch circuit F2200 illustrated at a lower right of the first T-branch circuit F2100.

The above-described first power, second power, third power, and fourth power may be transmitted to at least one radiating element of each quarter array on an upper side of a planar array antenna.

FIGS. 8A and 8B show the simulation results of the electrical characteristics of the feed network F2000 described above. That is, in the GNSS band (1.1 to 1.6 GHz, fc=1.35 GHz), an input return loss characteristic of the feed network F2000 exhibits 17.8 dB or more, a relative amplitude error between four channels exhibits ±0.4 dB or less and is good, and a maximum cumulative phase error between the four channels exhibits ±5.0° or less, and thus very excellent frequency-phase dispersion correction characteristics are shown.

Figure 9A:
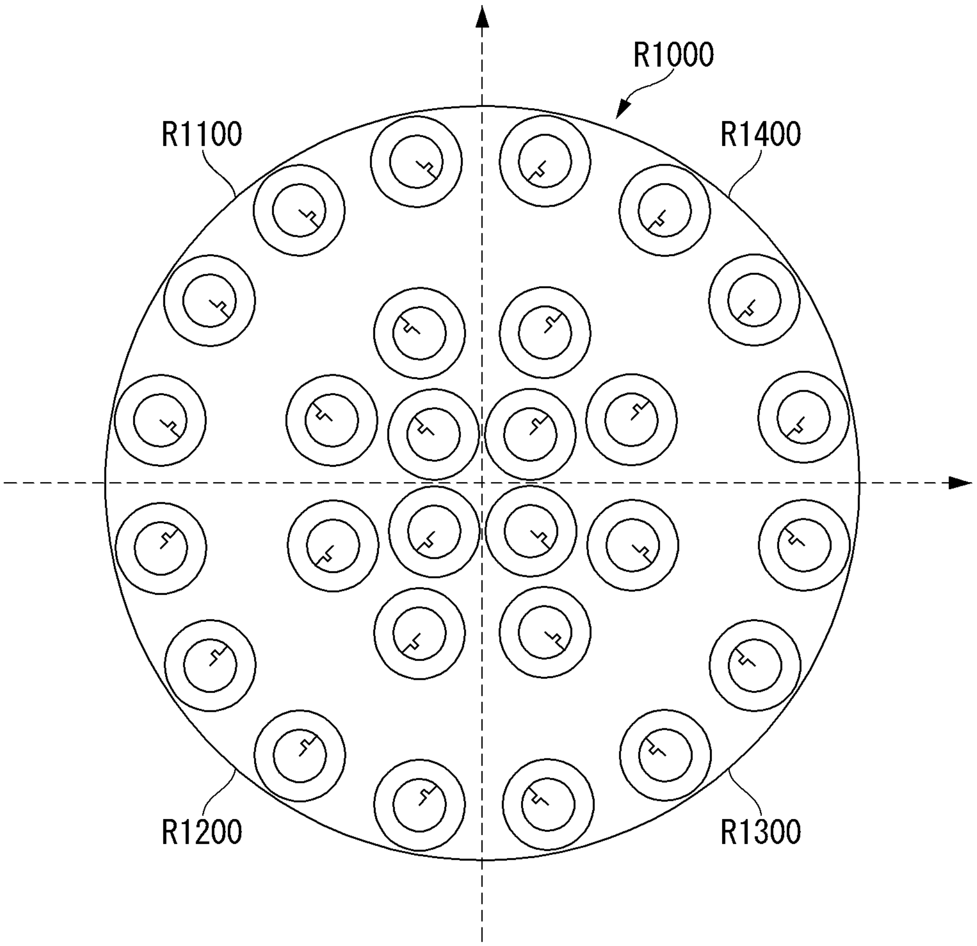
FIG. 9A is a schematic diagram illustrating an upper shape of a beamforming planar array antenna (N=28) operating in a GNSS band according to still another embodiment of the present disclosure.
Figure 9B:
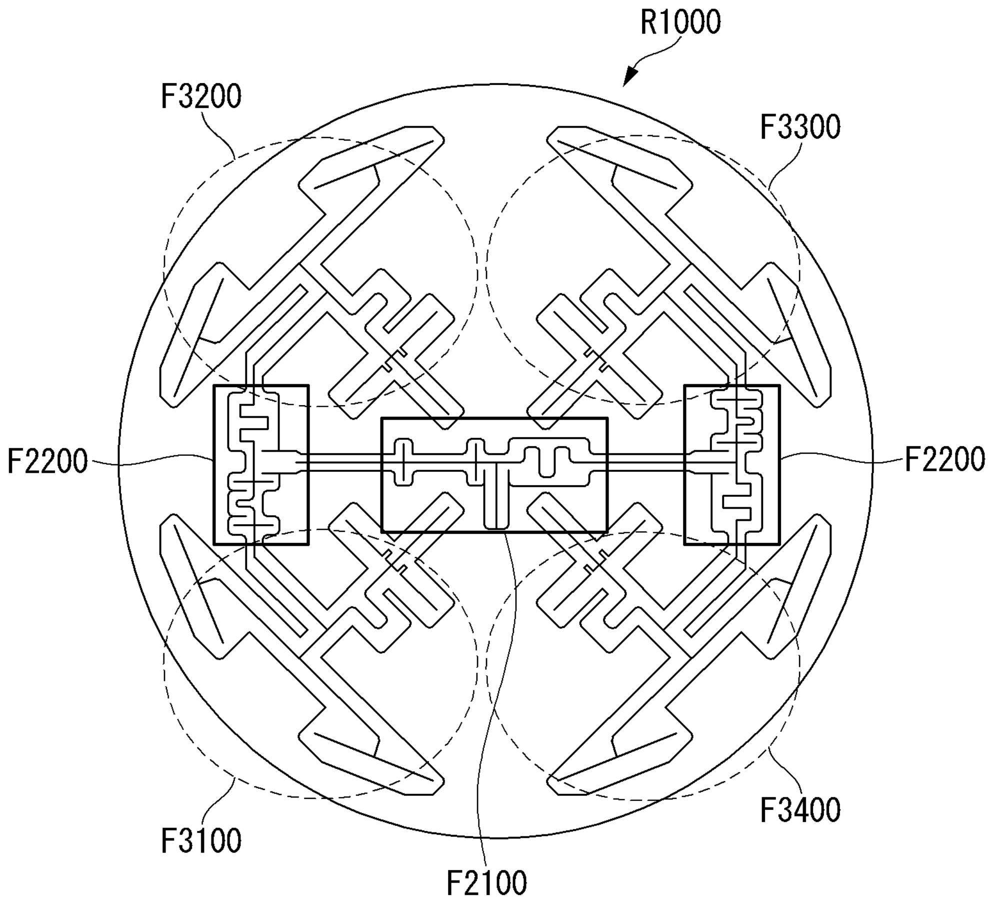
FIG. 9B is a schematic diagram illustrating a lower shape of the beamforming planar array antenna of FIG. 9A.

FIG. 9A is a schematic diagram illustrating an upper shape of a beamforming planar array antenna (N=28) operating in a GNSS band according to still another embodiment of the present disclosure. FIG. 9B is a schematic diagram illustrating a lower shape of the beamforming planar array antenna of FIG. 9A.

Referring to FIGS. 9A and 9B, in a beamforming planar array antenna R1000, the feed network described above with reference to FIG. 7 may be implemented as a 4-way feed network optimized in design in the GNSS band.

Unit radiating elements constituting the planar array antenna R1000 may be cylindrical helix elements, and in this case, a diameter of the cylindrical helix element may be about 1 wavelength and may be formed to provide axial mode radiation characteristics.

In the present embodiment, the number of entire array elements of the planar array antenna R1000, that is, the number of radiating elements is 28, and the number of radiating elements of each of quarter arrays R1100, R1200, R1300, and R1400 is 7. The quarter array composed of the seven radiating elements may be sequentially and rotatably disposed in a right direction for each quarter array. The planar array antenna R1000 may include a non-uniform 7-way power distribution feed network in order to supply beamforming power to the quarter array composed of the seven radiating elements. The non-uniform 7-way power distribution feed network may be referred to simply as a 7-way feed network.

The 7-way feed network may include one first T-branch circuit F2100, two second T-branch circuits F2200, and four power distribution circuits F3100, F3200, F3300, and F3400.

Among the four power distribution circuits, a first power distribution circuit F3100 and a second power distribution circuit F3200 may be connected to a lower side and an upper side of a second T-branch circuit F2200 positioned on one side of the first T-branch circuit F2100, respectively, and may be disposed to supply power having substantially the same amplitude and a phase difference of about 90° to two quarter arrays which are positioned in a third quadrant and a second quadrant of the planar array antenna R1000.

Further, among the four power distribution circuits, a third power distribution circuit F3300 and a fourth power distribution circuit F3400 may be connected to an upper side and a lower side of a second T-branch circuit F2200 positioned on the other side of the first T-branch circuit F2100, respectively, and may be disposed to supply power having substantially the same amplitude and a phase difference of about 90° to two quarter arrays which are positioned in a first quadrant and a fourth quadrant of the planar array antenna R1000.

Here, third power supplied to the corresponding quarter array through the third power distribution circuit F3300 may have substantially the same transmission amplitude as second power supplied to the corresponding quarter array through the second power distribution circuit F3200, and may have a phase difference of about 90°.

According to the configuration described above, when the beamforming planar array antenna R1000 of FIG. 9A is placed on a flat surface and viewed from above for the configuration of a planar array with beamforming, the beamforming planar array antenna R1000 may control four first ring arrays (N=4) positioned at an inner center of a circular planar array of the planar array antenna and eight second ring arrays (N=8) positioned around the first ring arrays to have the same phase, and control third ring arrays (N=16) positioned on an outer edge thereof with a constant gap from the first and second ring arrays to have a phase opposite thereto. Here, N may correspond to the number of unit radiating elements.

FIGS. 10A to 10D are diagrams showing simulation results of AR characteristics of the beamforming planar array antenna operating in the GNSS band of FIG. 9B.

Figure 10A:
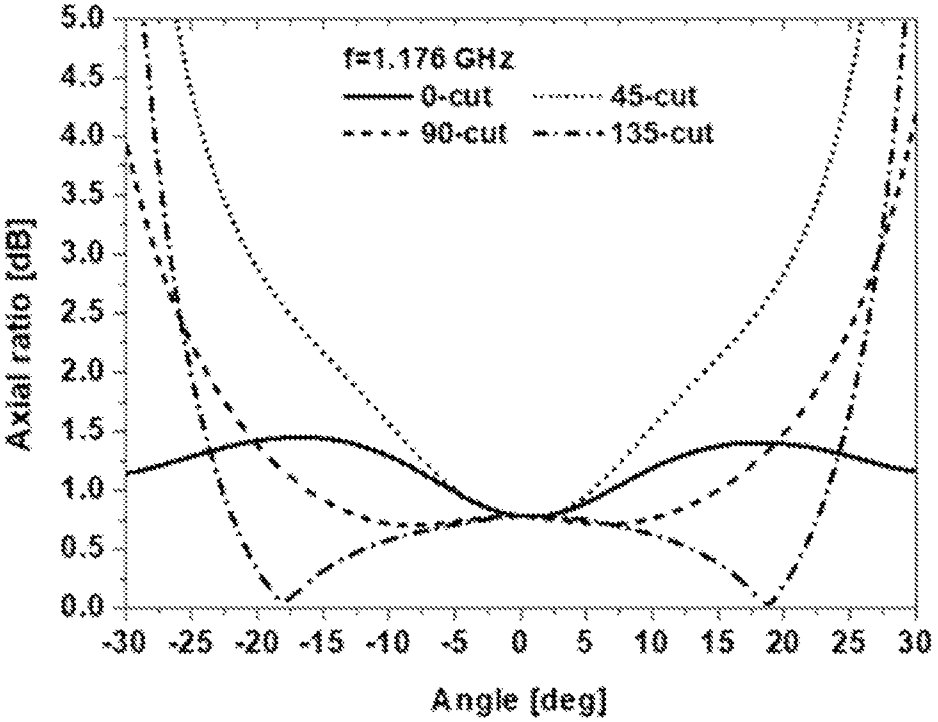
FIGS. 10A to 10D are diagrams showing simulation results of AR characteristics of the beamforming planar array antenna operating in the GNSS band of FIG. 9B.
Figure 10B:
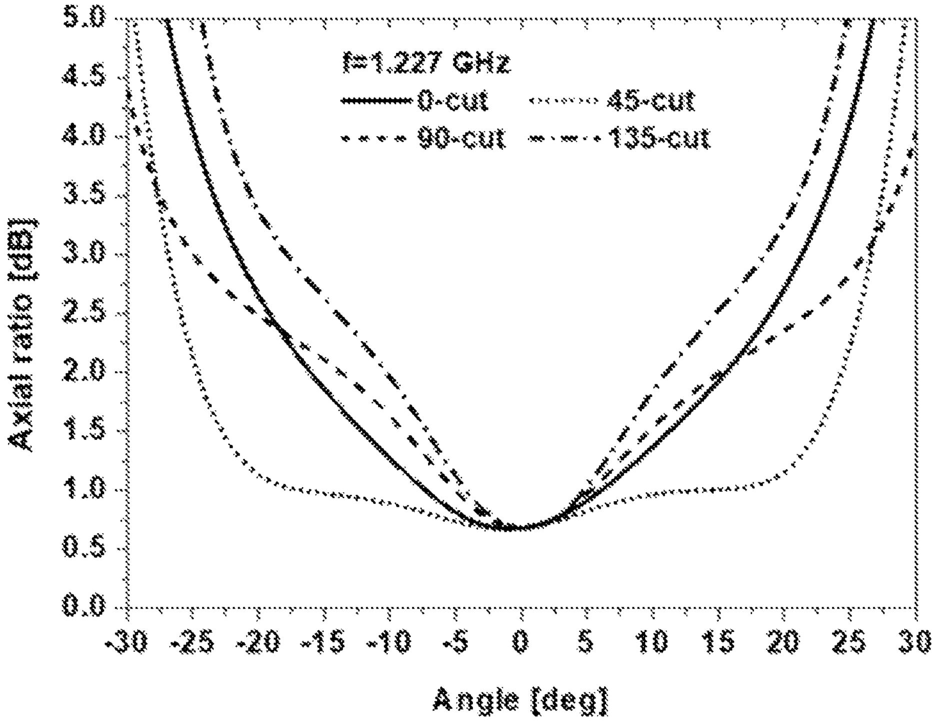
Figure 10C:
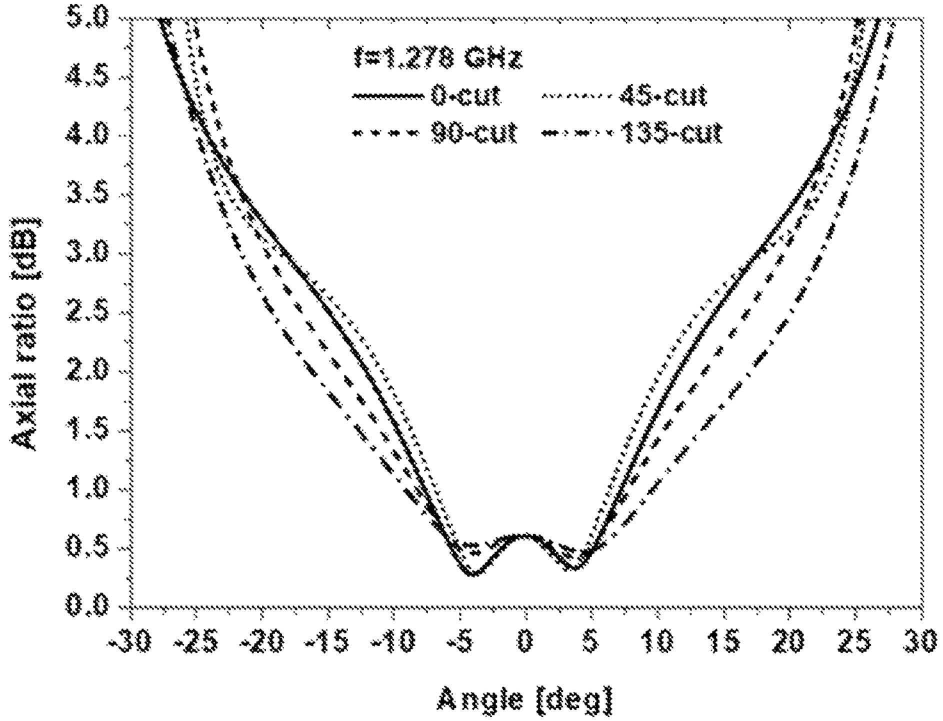
Figure 10D:
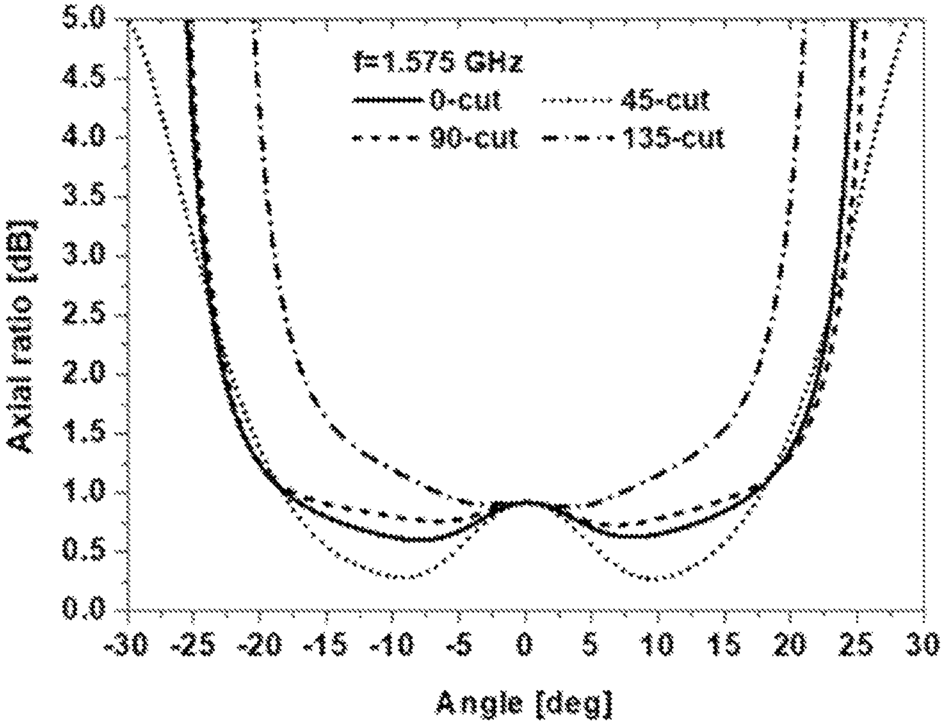

As shown in FIGS. 10A and 10D, it can be seen that the beamforming planar array antenna is a circular planar array antenna including 28 unit radiating elements and exhibits excellent AR characteristics of 1.0 dB or less over a wideband.

When a feed network for seven quarter array elements is improved to a non-uniform 7-way power distribution feed network, excellent AR characteristics of 0.5 dB or less may be obtained over a wideband.

Table 3 shows AR characteristics in a boresight direction simulated in each global positioning system (GPS) signal band for 1.176 GHz (GPS L5), 1.227 GHz (GPS L2), 1.278 GHz (GPS L6), and 1.575 GHz (GPS L1) frequencies.

TABLE 3

| Frequency [GHz] | AR @ Boresight(0°) |
|---|---|
| 1.176 GHz (GPS L5) | 0.79 dB Max. |
| 1.227 GHZ (GPS L2) | 0.68 dB Max. |
| 1.278 GHz (GPS L6) | 0.61 dB Max. |
| 1.575 GHz (GPS L1) | 0.92 dB Max. |

The above-described beamforming planar array antenna may be formed to allow a predetermined control device to control beamforming.

Figure 11:
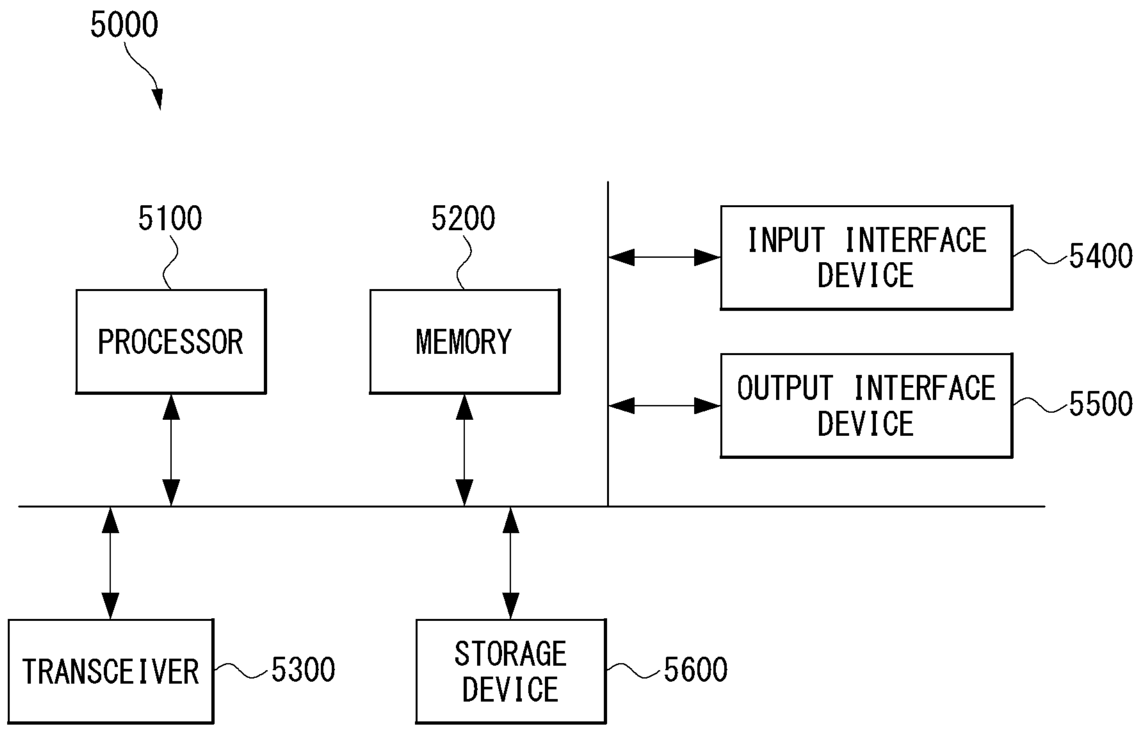
FIG. 11 is an exemplary diagram of a configuration of a control device that can be applied to the beamforming planar array antenna of FIG. 9A.

FIG. 11 is an exemplary diagram of a configuration of a control device that can be applied to the beamforming planar array antenna of FIG. 9A.

Referring to FIG. 11, a control device 5000 that can be applied to the beamforming planar array antenna may include at least one processor 5100 and a memory 5200 in which at least one command executed by the processor 5100 is stored. Further, the control device 5000 may further include a transceiver 5300 that is connected a wired network, a wireless network, a satellite network, or a combination thereof to perform communication.

Further, the control device 5000 may further include an input interface device 5400, an output interface device 5500, a storage device 5600, and the like, optionally as necessary. The respective components included in the control device 5000 may be connected to each other through a bus 5700 to communicate with each other, or may be connected to each other through individual interfaces or individual buses with the at least one processor 5100 positioned therebetween. For example, the processor 5100 may be connected to at least one of the memory 5200, the transceiver 5300, the input interface device 5400, the output interface device 5500, and the storage device 5600 through a dedicated interface.

The processor 5100 may execute a program command stored in at least one of the memory 5200 and the storage device 5600. The processor 5100 may function to automatically adjust characteristic impedances of a main line and stub lines which are installed to correct a frequency-phase dispersion error in a wideband on the basis of at least one command or program command, thereby adjusting a slope of a phase characteristic of a transmission line. The processor 5100 may be a central processing unit (CPU), a graphics processing unit (GPU), or a dedicated processor in which the methods according to the embodiments of the present disclosure are performed.

Each of the memory 5200 and the storage device 5600 may include at least one of a volatile storage medium and a non-volatile storage medium. For example, the memory 5200 may include at least one of a read only memory (ROM) and a random-access memory (RAM).

Meanwhile, the methods of controlling the feed network for correcting the frequency-phase dispersion error in the wideband according to the present disclosure may be implemented in the form of program instructions that can be executed by various computer means, and recorded on computer readable media. The computer readable media may include program instructions, data files, data structures, etc. alone or in combination. The program instructions recorded on the computer readable media may be specially designed and configured for the present disclosure or may be known and usable to those skilled in the art of computer software.

Examples of the computer readable media include hardware devices specially configured to store and execute program instructions, such as an ROM, an RAM, a flash memory, and the like. Examples of the program instructions include high-level language code that can be executed by a computer using an interpreter or the like as well as machine language code generated by a compiler. The hardware devices described above may be configured to operate as at least one software module to perform the operations of the present disclosure, and vice versa.

Further, the above-described control device may be implemented as a hardware component, a software component, and/or a combination thereof. For example, the control device may be implemented using at least one general purpose or special purpose computer, such as a processor, a controller, an arithmetic logic unit (ALU), a digital signal processor, a microcomputer, a field programmable array (FPA), a programmable logic unit (PLU), a microprocessor, or another device that can execute and respond to instructions.

The control device may further include an operating system (OS) and one or more software applications running on the OS. Further, the control device may access, store, manipulate, process, and generate data in response to execution of software. It can be seen that, for convenience of understanding, there are cases in which one control device is used, but those skilled in the art will understand that the control device includes a plurality of processing elements and/or a plurality of types of processing elements. For example, the control device may include a plurality of processors or include one processor and one controller. Further, the control device may also include another processing configuration such as a parallel processor.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A feed network device which is electrically connected to unit radiating elements for circular polarization, comprising a phase offset compensation circuit configured to correct a phase dispersion error according to a change in frequency so that four quarter arrays obtained by vertically and horizontally dividing a planar array of the unit radiating elements symmetrically are electrically and rotatably sequentially disposed clockwise or counterclockwise;

wherein the four quarter arrays include a first ring array disposed at an inner center of a planar array having a circular structure, a second ring array disposed around the first ring array, and a third ring array which is spaced a predetermined interval from the second ring array and disposed on an outer edge of the planar array.

2. The feed network device of claim 1, wherein the phase offset compensation circuit includes a 180° phase offset compensation circuit, and two 90° phase delay compensation circuits coupled to both ends of the 180° phase offset compensation circuit.

3. The feed network device of claim 2, wherein the 180° phase offset compensation circuit includes a standard transmission line with a 360° electrical length, a main line with a 180° electrical length, and open-short stub lines coupled to both ends of the main line and having a 45° electrical length, wherein a characteristic impedance of the main line and characteristic impedances of the open-short stub lines are adjusted to adjust a slope of the phase dispersion error according to a change in frequency of a transmission line.

4. The feed network device of claim 2, wherein each of the two 90° phase delay compensation circuits includes a standard transmission line with a 270° electrical length, a main line with a 180° electrical length, and open-short stub lines coupled to both ends of the main line and having a 45° electrical length, wherein a characteristic impedance of the main line and characteristic impedances of the open-short stub lines are adjusted to adjust a slope of the phase dispersion error according to a change in frequency of the transmission line.

5. The feed network device of claim 4, wherein each of the two 90° phase delay compensation circuits is configured to provide two output power feeds having a same transmission amplitude and a 90° phase difference characteristic.

6. The feed network device of claim 5, wherein electrical characteristics of the four output power feeds provided by the two 90° phase delay compensation circuits are configured so that the quarter arrays are rotatably sequentially disposed clockwise or counterclockwise by 90°.

7. The feed network device of claim 2, further comprising four power distribution circuits coupled to the two 90° phase delay compensation circuits.

8. The feed network device of claim 7, wherein, among the four power distribution circuits, a first power distribution circuit and a second power distribution circuit are connected to one side and another side of the 90° phase delay compensation circuit positioned on one side of the 180° phase offset compensation circuit, respectively, and are disposed to supply power to each of two quarter arrays of the four quarter arrays, and among the four power distribution circuits, a third power distribution circuit and a fourth power distribution circuit are connected to one side and the other side of the 90° phase delay compensation circuit positioned on another side of the 180° phase offset compensation circuit, respectively, and are disposed to supply power to each of remaining two quarter arrays of the four quarter arrays.

9. The feed network device of claim 8, wherein the four power distribution circuits are controlled so that the first ring array and the second ring array have a same phase and the third ring array has a phase opposite thereto.

10. The feed network device of claim 9, further comprising a control device configured to control operations of the four power distribution circuits.

11. A planar array antenna comprising:

unit radiating elements configured to constitute a planar array and generate circular polarization; and a feed network device which is electrically connected to the unit radiating elements, wherein the feed network device includes a phase offset compensation circuit that corrects a phase dispersion error according to a change in frequency so that four quarter arrays obtained by symmetrically vertically and horizontally dividing the planar array symmetrically are electrically and rotatably sequentially disposed clockwise or counterclockwise;

wherein the four quarter arrays include a first ring array disposed at an inner center of a planar array having a circular structure, a second ring array disposed around the first ring array, and a third ring array which is spaced a predetermined interval from the second ring array and disposed on an outer edge of the planar array.

12. The planar array antenna of claim 11, wherein the phase offset compensation circuit includes a 180° phase offset compensation circuit, and two 90° phase delay compensation circuits coupled to both ends of the 180° phase offset compensation circuit.

13. The planar array antenna of claim 12, wherein the 180° phase offset compensation circuit includes a standard transmission line with a 360° electrical length, a main line with a 180° electrical length, and open-short stub lines coupled to both ends of the main line and having a 45° electrical length, wherein a characteristic impedance of the main line and characteristic impedances of the open-short stub lines are adjusted to adjust a slope of the phase dispersion error according to a change in frequency of a transmission line.

14. The planar array antenna of claim 12, wherein each of the two 90° phase delay compensation circuits includes a standard transmission line with a 270° electrical length, a main line with a 180° electrical length; and open-short stub lines coupled to both ends of the main line and having a 45° electrical length, wherein a characteristic impedance of the main line and characteristic impedances of the open-short stub line are adjusted to adjust a slope of the phase dispersion error according to a change in frequency of the transmission line.

15. The planar array antenna of claim 14, wherein each of the two 90° phase delay compensation circuits provides two output power feeds with a same transmission amplitude and characteristic of a 90° phase difference.

16. The planar array antenna of claim 15, wherein electrical characteristics of the four output power feeds provided by the two 90° phase delay compensation circuits are configured so that the quarter arrays are rotatably sequentially disposed clockwise or counterclockwise by 90°.

17. The planar array antenna of claim 12, wherein the feed network device further includes four power distribution circuits coupled to the two 90° phase delay compensation circuits.

18. The planar array antenna of claim 17, wherein, among the four power distribution circuits, a first power distribution circuit and a second power distribution circuit are connected to one side and another side of the 90° phase delay compensation circuit positioned on one side of the 180° phase offset compensation circuit, respectively, and are disposed to supply power to each of two quarter arrays of the four quarter arrays, and among the four power distribution circuits, a third power distribution circuit and a fourth power distribution circuit are connected to one side and the other side of the 90° phase delay compensation circuit positioned on another side of the 180° phase offset compensation circuit, respectively, and are disposed to supply power to each of remaining two quarter arrays of the four quarter arrays.

19. The planar array antenna of claim 18, wherein the four power distribution circuits are controlled so that the first ring array and the second ring array have a same phase and the third ring array has a phase opposite thereto.

20. The planar array antenna of claim 19, further comprising a control device configured to control operations of the four power distribution circuits.

* * * * *